United States Patent [19]

Lindman et al.

[11] 4,340,473
[45] Jul. 20, 1982

[54] APPARATUS FOR JOINT PARTICULATE RECOVERY AND LIQUID PURIFICATION

[75] Inventors: William E. Lindman, Fountain Valley; John A. Alexander, Cayucos, both of Calif.

[73] Assignee: Precipitator Corporation, Santa Fe Springs, Calif.

[21] Appl. No.: 189,339

[22] Filed: Sep. 22, 1980

Related U.S. Application Data

[60] Division of Ser. No. 840,414, Oct. 7, 1977, Pat. No. 4,224,148, which is a continuation of Ser. No. 597,217, Jul. 18, 1975, abandoned.

[51] Int. Cl.³ .................................................. B01D 21/01
[52] U.S. Cl. ...................................... 210/173; 210/181; 210/199; 210/206; 210/207; 210/220; 210/243; 204/302
[58] Field of Search ............... 210/702, 709, 714, 721, 210/715, 716, 723, 724, 737, 738, 746, 748, 173, 181, 187, 195.3, 198.1, 199, 200–202, 205, 206, 208, 220, 221.3, 243, 252; 204/149, 302

[56] References Cited

U.S. PATENT DOCUMENTS

| | | | |
|---|---|---|---|
| 2,116,053 | 5/1938 | Urbain et al. | 210/717 |
| 3,522,173 | 7/1970 | Lindman et al. | 210/709 |
| 3,575,853 | 4/1971 | Gaughan et al. | 210/713 |
| 3,575,854 | 4/1971 | Richards | 210/720 |
| 3,583,910 | 6/1971 | Stoddard | 210/713 |
| 3,586,623 | 6/1971 | Kuhn | 210/763 |
| 3,617,559 | 11/1971 | Cywin | 210/713 |
| 3,728,253 | 4/1973 | Kaufman | 210/624 |
| 3,741,890 | 6/1973 | Smith et al. | 210/667 |
| 3,801,501 | 4/1974 | Kennedy | 210/724 |
| 3,948,774 | 4/1976 | Lindman | 210/192 |
| 4,013,557 | 3/1977 | Snodgrass et al. | 210/243 |

FOREIGN PATENT DOCUMENTS

768752 2/1957 United Kingdom ................. 210/243

Primary Examiner—Peter A. Hruskoci
Attorney, Agent, or Firm—Howard L. Johnson

[57] ABSTRACT

Apparatus for step-wise purification treatment of contaminated polar liquid, such as water, by the procedure of U.S. Pat. No. 4,224,148, comprising successive flow-connected container units, electrically insulated from the ground, the sequential units providing: (a) macerating/distributing means for producing suspension of selected small-particle-size contaminant which will accept a galvanic charge, (b) means for maintaining acidic pH of 2 to 2.5 in presence of gaseous oxidizing agent, (c) source of soluble metal ions adapted to impart a galvanic charge on the small particles, plus subsequent aeration means, (d) means for introducing alkaline reagent while air blowing to restrain precipitation, (e) means for alkaline flocculation of separable particles, including pH control means and switch means for electrically grounding the liquid medium.

4 Claims, 6 Drawing Figures

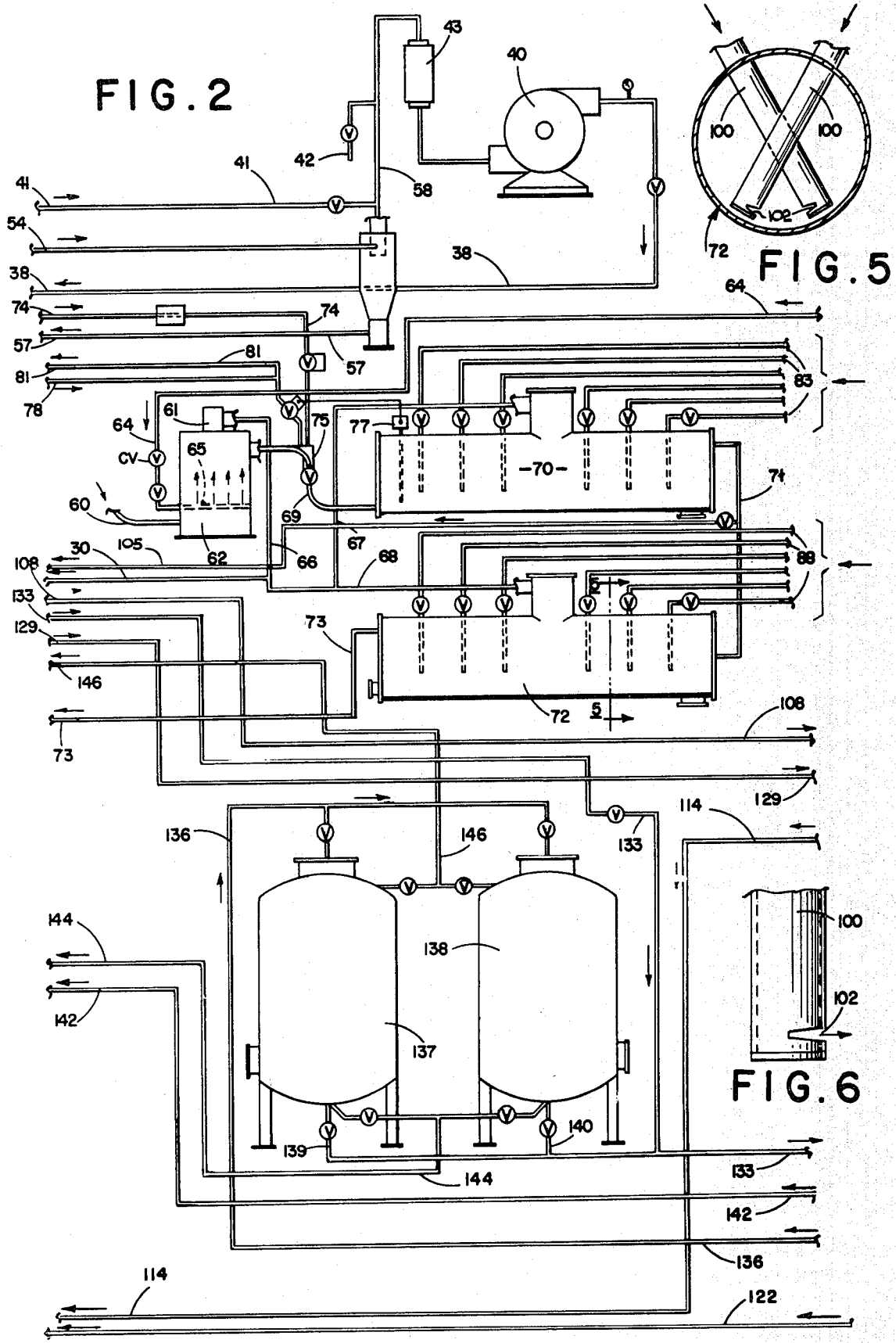

APPARATUS FOR JOINT PARTICULATE RECOVERY AND LIQUID PURIFICATION

This is a divisional application of Ser. No. 840,414, filed Oct. 7, 1977, now U.S. Pat. No. 4,224,148 issued Sept. 23, 1980, which last application was a continuation of Ser. No. 597,217, filed July 18, 1975, now abandoned.

BACKGROUND OF THE INVENTION

The demand for water purification does not arise solely from the need for treating sewage or noxious industrial waste, nor is it necessarily directed merely toward obtaining potable water for humans and animals. Recent environment control regulations have restrained the discard of water such as that which through ordinary industrial use has appreciably increased its content of dissolved solids (which are generally inorganic or mineral compounds) as well as inhibiting discard of such liquid which has accumulated or concentrated particular toxic components.

For example, the body of water which is circulated as a coolant in many industrial or chemical plants, is then returned to a heat exchanger where part of it is evaporated in order to reduce the temperature of the remainder, which remainder is then recirculated. This evaporation step itself would increase the concentration of contained solids merely by reducing the volume of liquid. However in its travel the liquid picks up deposits or sediment from the plumbing system, and in addition, in order to minimise corrosion, foaming and scale formation (such as resulting from "hard water") various inhibitory additives are mixed into the circulating stream. These obviously contribute further to the dissolved solid content and after the latter has built up to the maximum allowable for continued circulation, it becomes necessary to discard part of the fluid mixture and replace it with fresh water (and new additives).

However this heavily loaded discard has now become an illegal pollutant when released into flowing streams or ocean. The problem is to purify it before release; and hopefully if such purification process is sufficiently successful or complete, the water may be reused indefinitely and need not be released at all.

A particular contaminant in such cooling water system is chromium which is a component of many anti-corrosive or biocide additives. Trushexavalent chromium is a toxic substance not releasable to the environment. Other toxic components of common cooling water additives are cyanides and phosphates, which must be detoxified before release.

Purification of polluted water for purposes of reuse, whether starting with agriculture/municipal sewage or with industrial waste, has been concerned primarily with recovery of potable water, only after the initial separation and disposal of solid components in an inert state, this being considered a necessary and preliminary step for any subsequent treatment. The solids may have then been utilized to a small extent as a plant support base or land fill, but such product was not a primary purpose for effecting the separation and for the most part the undifferentiated sludge is simply separated in bulk and discarded in the manner most convenient. Purification of the aqueous phase then takes place (if at all) as a successive rather than concurrent procedure. However, it will be realized that the aqueous run-off from many and probably most water-treating procedures (even if only involving flushing) carries a quantity of solid and potentially-solid ingredients having tangible economic value if such could only be recovered in concentrated form without great expense.

Further, treatment of such masses of contaminated water in the past has been primarily on a batch basis, large bodies of water being treated with acid or other reagent in a "settling basin" or even in successive chambers and then allowed to stand for a prolonged period until spot checks shows that the supernatent was clarified. In brief, it has not been realized that by careful regulation of the parameters of a flowing stream, containing charged separation particles, purification of an impure aqueous medium could be effected in a fraction of the previous time, and also that the controls could be shifted so as to maximise the withdrawal of specific contaminants which it was desired to concentrate in the solid state. Some substances it may be desired to destroy—as microorganisms, herbicides, pesticides and inorganic toxins—or to recover, such as nitrogenous compounds, precious metals, etc. Accordingly, the control parameters of such flow-treatment can now be accommodated to a particular feed stock and with a view to how it is wished to dispose of specific contaminants.

In the past it was known to oxidise aqueous contaminants in a highly acidic medium in the presence of either mineral acid or sulfite ion (furnished by sulfur dioxide or sulfurous acid), plus a heavy metal (flocculating) ion such as furnished by iron or aluminum. Reference is made to pending application Ser. No. 403,893, filed Oct. 5, 1973 by the present co-inventor W. E. Lindman, which is here incorporated by reference. However, in the absence of the present knowledge of how to incorporate and utilize (especially charged) particulate matter in oxidizing the flowing contaminate stream, experience had demonstrated that (a) unlimited oxidation in the iron reaction chamber resulted in deposition of oxidation products (derived from sewage) clogging the porous iron bed and ultimately stopping the flow, (b) the trouble at this particular chamber might be relieved by excluding oxygen at this point but its necessary introduction upstream or downstream therefrom still produced inconsistent results which might vary widely from time to time and without apparent explanation. Total exclusion of oxygen from the system made the whole inoperative, but its self-distribution therein yielded peripatetic results.

However, further detail consideration at the molecular level of both interaction and lack of reaction in such systems, reinforces the observation that too often multiple potential reactants may be present in a common container and may even be swished or driven together in a liquid medium without the substrate (in this case, the solid contaminant) and the anticipated reactant (oxygen) contacting or linking together in a reactive state in appreciable quantity. As a comparison, many specialized reactions such as catalytic cracking, require a particularly tailored catalyst. By analogy, the present invention provides a particularly tailored "environment" wherein gas, liquid and solid phases are each conditioned for mutual interplay of the reacting forces.

SUMMARY OF THE INVENTION

In brief, it has now been found that the known process for removing oxidizable contaminants from polluted water by treatment with sulfur dioxide and a flocculating metal such as iron or aluminum can advantageously be effected under controlled pH and flow conditions of concurrent/contacting dual gas and liquid flow streams and in the deliberate presence of precise concentrations of charged particles which form part of cation transferrence reaction phenomena as hereafter defined, which procedure results (depending on the feed stock) in rapid desalinification, removal of hardness, alkalinity, turbidity, suspended and dissolved solids, plus agglutination and inactivation of microscopic unicellular life forms such as bacteria and virus, removal of herbicides, pesticides and inorganic toxins from the liquid phase, and concentration of nitrogenous and phosphate components in a solid separable phase (which may be used as a fertilizer or animal feed). Removal toxins—ultimately separable from both sludge and liquid by digestions and specific precipitations—include inorganic components such as arsenic, cadmium, lead, mercury, selenium and boron. Due to oxygen saturation continuing, final potable effluent is not "dead" water but typically contains at least 9.5 to 10.5 mg/l. dissolved oxygen. The solid separated component is sterile, the initial Chemical Oxygen Demand (COD) and Biochemical Oxygen Demand (BOD) having been reduced on the order of 98 or 99% (starting for example with fecal matter or sewage).

Under the step-wise oxidizing conditions and imposed galvanic flow pattern, metallic ions agglutinate with particulate matter and are replaced in the aqueous medium by other cations, i.e. hydrogen ions, at the same time maintaining the selected concentration of acidity. Among other reactions, part of such hydrogen ions couple with available nitrogen to form $NH^+$. Such ammonium ion then couples with ferrous ion to form (green) ferrous ammonium ion. Requirements for such flowing galvanic system are: minimum particulate concentration of about 0.1% w. with a density between about 1.05 and about 2.0, and a size of about 30 to about 225 microns with free surface energy of about 100 to about 500 ergs/cm$^2$.

For the present purpose, the liquid medium, of which water is the commonest example, should be a polar compound; other examples are alcohols, acids, bases and other substances which ionize or conduct an electric current. The particulate matter, as a first requirement, should also possess a similar characteristic so as to be capable of providing a useable Van der Waals or London effect—that is, the molecule exhibits a spin characteristic which results from an unsymmetrical structure of the molecule. This contributes or results in a random movement within the liquid of the molecule or the corresponding particle, and also presents forces of attraction which—in conjunction with its linear movement—cause it to impact and adhere smaller particles or molecules to its surface. An example of this which is particularly utilized in the present circumstances is the attraction and adhesion of minute gas bubbles (containing gaseous oxygen) to the particulate surface.

In this connection it will be realized that the smaller the particle size, the greater the relative surface area and the greater the forces of surface attraction (relative to weight), so that the relative influence of gravity on the particle is correspondingly diminished. Thus the specific surface energy of a given solid can multiply more than 8000 times in going from approximately two inch diameter to one micron. Its unit surface energy at the same time increases more than 600%. Accordingly, the greater the fractionation (maceration) of the bulk material into small particles, the greater effect the increased surface energy will have on reaction and flow properties. This factor is the same of course whether the material constitutes matter which (in addition to its carrier function) is to be oxidized, or whether it is particulate matter added merely for its function of carrying a charge in the flowing galvanic stream.

However it will be apparent also that such fractionated particles, possessing Brownian movement and increased unit surface energy, have a strong tendency to coalesce if brought together; that is, they become a non-free-flowing mass rather than acting as independent discrete particles. Such potential coagulation is prevented by (1) pump action, mechanical agitation, and passage of gas currents through the liquid, each applied at a particular critical location, and (2) by moving the galvanic flow stream at a varied and deliberate rate in accordance with Reynolds Numbers and other dimensionless parameters selected to prevent phase separation. Thus when later such suspended particles (galvanically charged) are finally directed to settle out, in cooperation with a flocculating ion, cancellation or grounding of the galvanic charge tremenduously reinforces this final (desired) phase separation. One particularly notable and totally unexpected result from this flowing galvanic cell and from the van der Waals surface effect exhibited by the particulate dispersion, is that by the present process soluble salts (such as NaCl or other alkali halides) present in the liquid, also leave their state of solution and enter into the separating flocculate. This desalinification may also be explained in part by continuation of the suspended flocculate in an oxygen saturated medium until the reduced flocculating ion (ferrous) is itself completely oxidized (to ferric ion).

To restate the present process: flowable contaminants of a liquid may be either or both soluble and solid (the latter being held suspended by a moving stream). They may or may not be in a condition of lower valence or be subject to having toxicity destroyed by oxidization, but in any event the flow is exposed to a strong oxidizing treatment (initially in a strongly acidic environment which is then shifted to a highly alkaline environment) in a moving ionic exchange medium which characteristic is furnished by a combination of van der Waals surface action of particulate matter and by galvanic charge imposed on such particles; one result of this is that gas bubbles (or air and sulfur dioxide) surface-adhere to and react with oxidizable particles and are replenished by inert particles (carriers) transferring similar bubbles to them. The flow is moved through successive treating units at rates of flow determined by dimensionless numbers such as Reynolds, Schmidt Numbers, Peclet Numbers, Lehman Reaction Numbers, Weber Numbers, Stanten Numbers and certain bed contact numbers. After alkaline treatment and continued gaseous oxidation, the non-liquid components are flocculated and separated as a sterile solid sludge. The latter may then be digested and/or fractionated to concentrate and retrieve particular ingredients of value, by use of known methods.

Whereas in the past it was only dimly appreciated that the $SO_2$-iron oxidative reaction required the presence of free electrons (apparently transferring between ions), it is now realized that it is highly desirable to provide such a "galvanic exchange" condition throughout the whole procedure and particularly in conjunction with (a) turbulence or agitation, and (b) the intimate presence of gaseous oxygen continuing through successive steps until the flocculating ion itself is oxidized. As already noted, the galvanic charge imposed on the particulate matter by the added electrolytes (acid and basic reagents) promotes or accentlates the surface adhesion of gas to particle, and enables the interchange of electrons. Such a reacting state is then maintained, and phase separation prevented, by movement at a tailored flow rate.

Typical surface-adsorbent particulate matter may be either oxidizable or non-oxidizable and includes cellulosic or other organic matter as well as inorganic compounds such as metallic oxides (alumina, magnesium oxide, calcium oxide, etc.) and especially compounds of atoms which have a van der Waals [packing] radii of about 1.9 or less.

BRIEF DESCRIPTION OF THE DRAWINGS

FIGS. 1, 2, 3 show in semi-schematic representation, a process and apparatus embodying the present invention, with the various flow connections being horizontally alignable when the three sheets are placed side by side in this order.

FIG. 5 is a vertical sectional view on line 5—5 of the homogenizer tank of FIG. 2.

FIG. 6 is an enlarged fragmented detail of an end outlet segment of an air delivery conduit of tanks 70 and 72.

TYPICAL FLOW PATTERN AND TREATMENT UNITS

Figure 1:
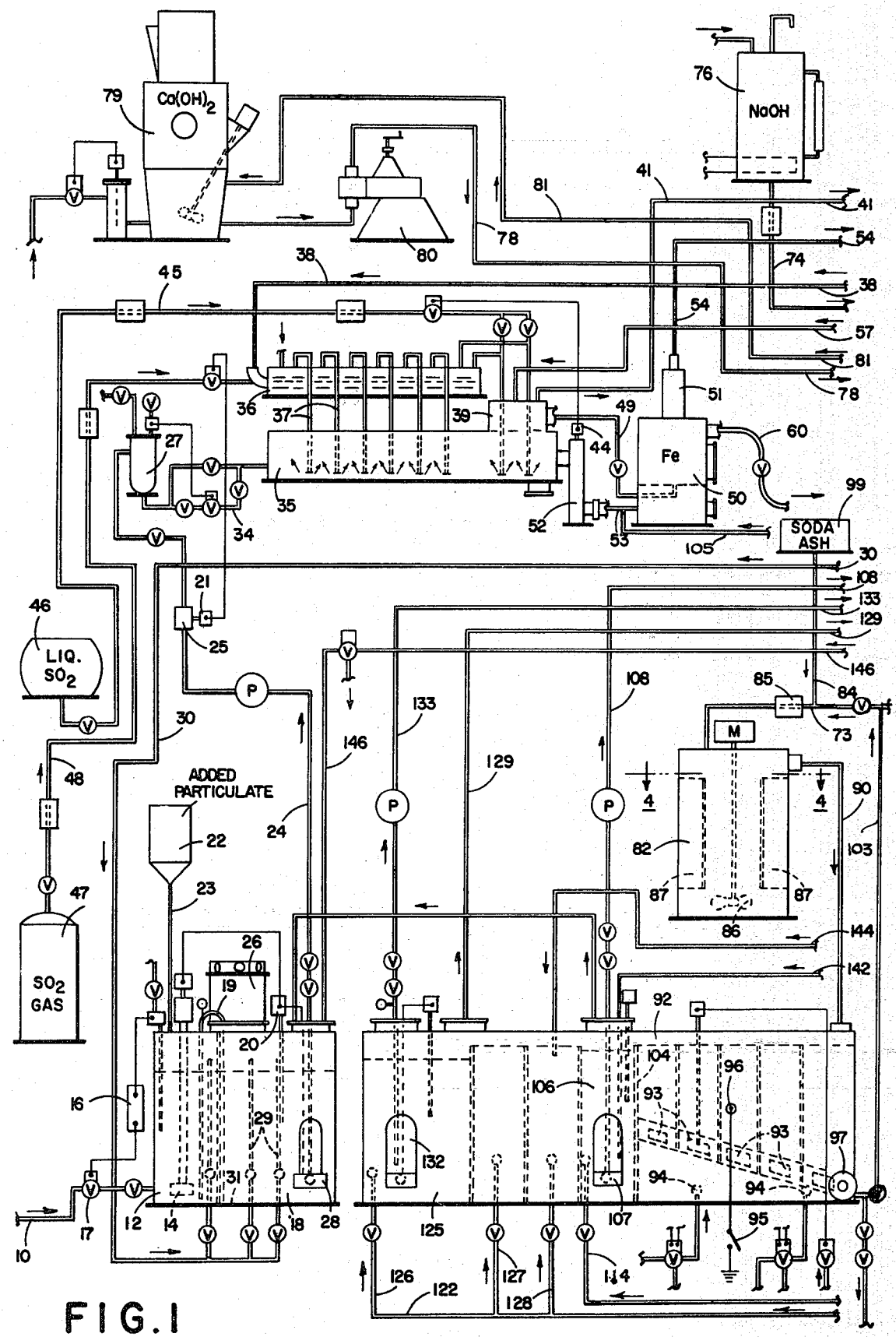
Figure 4:
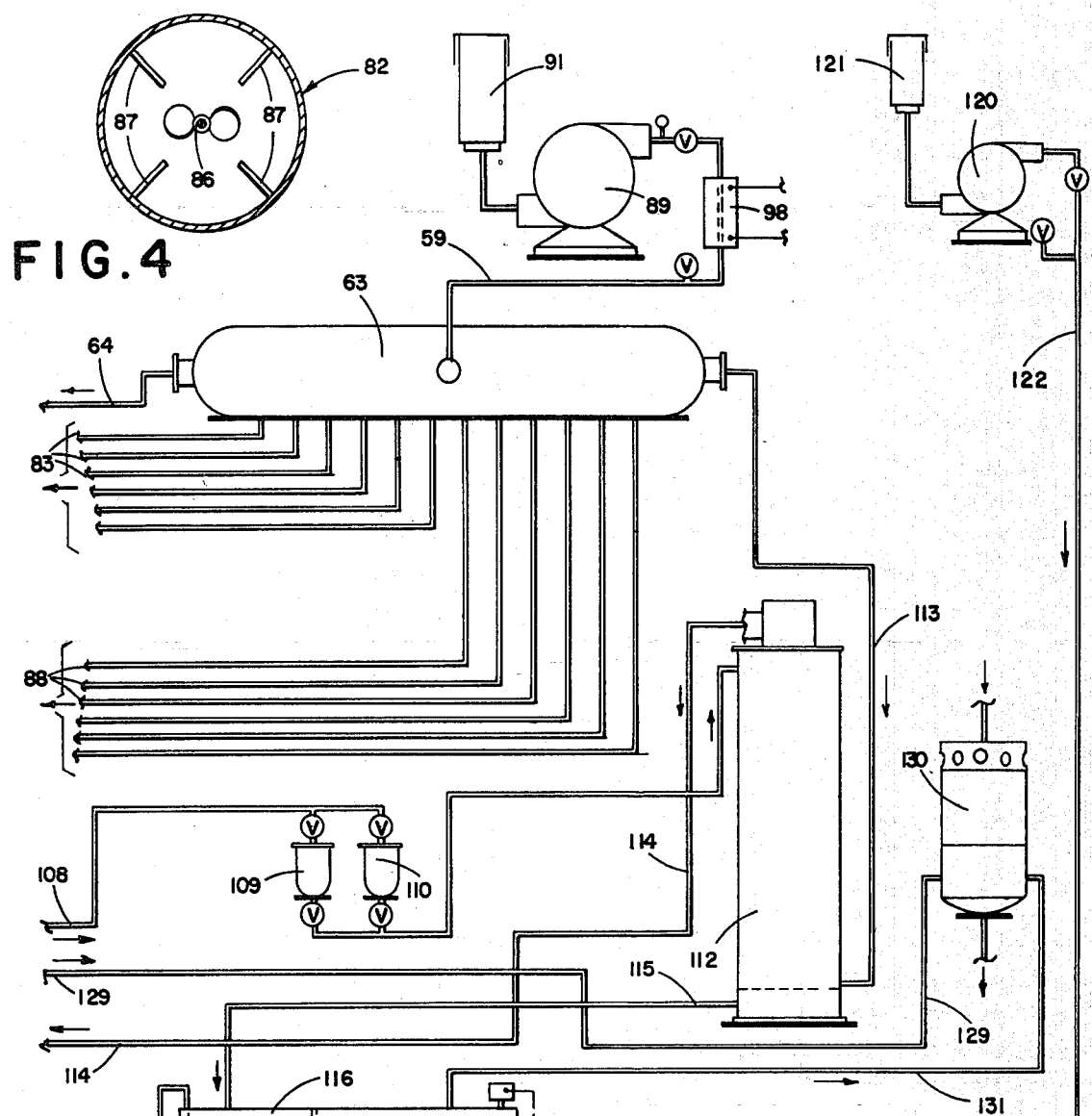
FIG. 4 is a horizontal sectional view taken on line 4—4 through the soda ash treatment unit of FIG. 1.
Figure 3:
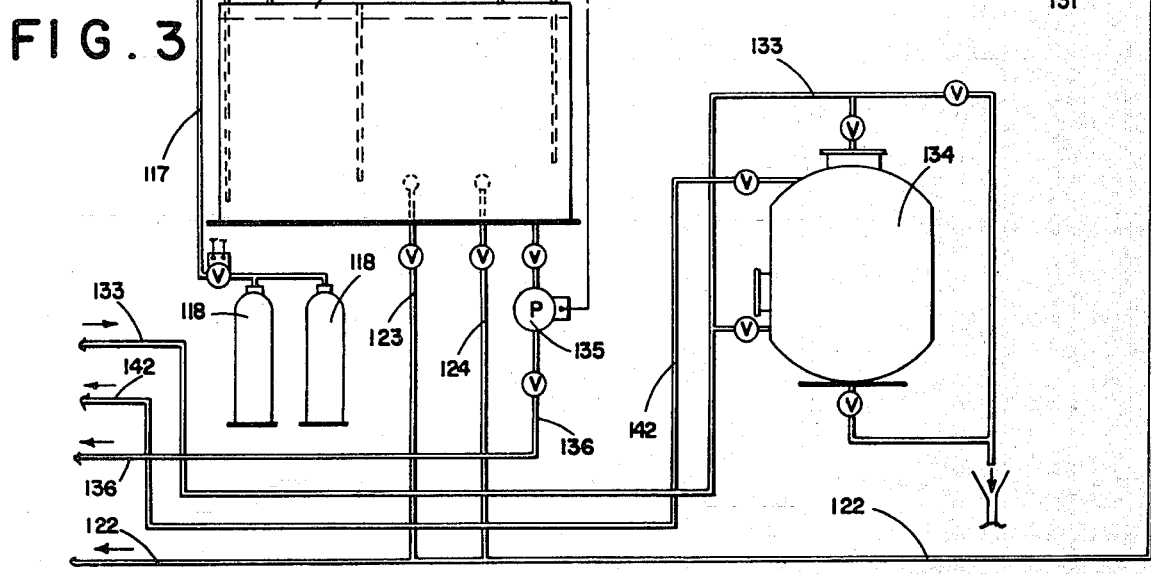

In the illustrated apparatus, a flowable feed stock such as raw sewage is introduced through an inlet conduit 10 into a wet well or fragmentation chamber 12 where a chopper pump 14 reduces the solid matter to the required particle size (30 to 250 microns). Liquid level in this chamber is regulated by an automatic control unit 16 which opens and closes a pinch valve 17 in the line. From the wet well the particulate dispersion is moved to a primary or marshalling tank 18 through a conduit 19 as regulated by a liquid level control unit 20. In the absence of any or sufficient solid matter in the feedstock, the required particulate matter, which may be any inert material which will hold a galvanic charge (e.g. shredded cellulose) is added to the wet well from a supply hopper 22 by a conduit 23.

The comminuted feed stock is ultimately withdrawn from the primary tank 18 through conduit 24 at a rate determined by a suction pump 25 and conveyed to a pulsation damper tank 27. A controlled quantity of exhaust gas is released from the top of the closed tank 18 through a wet charcoal filter unit 26 and vented (odorless) to the atmosphere. Within the primary tank 18 is a submerged transfer pump 28 which is operated to maintain a continous flow of fluid and suspended particles. Turbulence within tank 18 is contributed in part by the presence of internal baffles 29 and by continuous bubbles of a (recycled) gas mixture from conduit 30 which enter through perforations in the piping adjacent the flooring 31 of the tank. To the extent that the liquid medium is clear enough, it is visually discernable that small gas bubbles here adhere to the surface of the moving solid particles within the liquid, and their gaseous oxygen content (derived initially from air) plus $SO_2$ pretreats or conditions oxidizable particles for subsequent oxidation. In the case of highly oxidizable matter such as fecal debris, a residence time in the preliminary chamber 18 on the order of about one and a half to about two hours is indicated.

From the pulsation dampener tank 27, the flow, at a rate controlled by mass flow meter 21 is moved through conduit 34 to a mixer tank 35 where it is intermingled with a gaseous mixture of sulfur dioxide and air introduced by drop lines 37 from an overhead gas mixing chamber 36. Recycled gas is introduced to the mixer chamber 36 through the line 38 coming from a compressor 40 which receives exhaust gas through line 42, passing through a silencer unit 43. Both the gas mixer 36 and the flow mixer tank 35 are at times supplied with liquid sulfur dioxide through line 45 from a supply tank 46 (which may be heated), in response to a pH meter 44 which maintains the tank 35 within the pH range of about 2.0 to about 2.5. Alternately or concurrently sulfur dioxide gas is supplied to the gas mixer 36 from supply source 47 through conduit 48, controlled by pH meter 44 and/or the mass flow meter 21. In tank 35, Peclet Numbers will range between 9 and 25. Lehman reaction numbers of the blow tubes 37 vary from 3.5 to 8; for eductors 25 to 30.

Exhaust gas from the tower 39 is continuously introduced into the iron reaction chamber 50 as a stream of bubbles through conduit 49, while at the same time the liquid flow containing a controlled amount of free gas bubbles is passed through an outfall conduit 52 and introduced through line 53 into the reaction chamber 50 below the porous bed. It is very important that gas inlet valve 49 be partially closed and thus used to divert with the fluid flowing through the line 53. The gas mixture which is passed jointly through the scrap iron bed (which furnishes both ferrous and ferric ions to the medium) and through the liquid flow stream, should contain a mixture of both nitrogen and oxygen (i.e. air). Vaporous mixture from the stack 51 of the iron chamber is passed through the conduit 54 which separates the non-gaseous components (i.e. liquid droplets) and returns them to the mixer tank 35 of the main flow by way of conduit 57 or into the discharge from tanks 70 or 72; the gaseous portion is recycled through the compressor 40 by the line 57.

Liquid outflow from the reaction tank 50 has a pH of about 3.0 to about 3.5 and is passed through conduit 60 to a blow tank 62 where air from a reservoir 63, by conduit 64 and manifold 65 is passed upward through the liquid so as to separate it and to again provide a fluid system saturated with dissolved oxygen. The flow is generally red from ferrous ion. Gaseous take-off from stack 61 by conduit 66, and gases from tanks 70 & 72 by lines 67, 68 are returned by line 30 to primary tank 18. From the blow tank liquid outflow is conveyed to the lower level of the neutralizer tank by conduit 69. A conduit 74 connects a mixing throat 75 of the outflow conduit 69 to a caustic supply tank 76, and a conduit 78 connects a lime slurry source 79 and circulating pump 80 to the mixing throat 75, the alkali flow to the neutralizer 70 being controlled by a pH meter 77. Instead of gradually neutralizing the acidic flow and progressively bringing it to the required alkalinity, of about pH 11, it has been found advantageous to introduce through the throat 75 at one time, substantially the whole quantity of alkali required to achieve the final pH for that immediate volume of flow with which it is mixed.

The air reservoir 63 initiates a plurality of air delivery lines 83 to the neutralizer tank 70 and a similar series 88 to the homogenizer tank 72, which individual lines are disposed to emit a bubbling shearing air stream from individual sparger or wedge-aperture nozzles at their distal ends, thus agitating the churning or foaming mass of liquid and charged particles at the same time that they supply oxygen and nitrogen. Consequently the emerging outflow through conduits 71 and 73 is oxygen saturated and the adsorbed gas on the particulate surface continues to be reactive. The flow of air through the several lines 83, 88 is controlled by individual (manual) valves or orifice plates so that it can be adjusted to the "step by step" progression of the increasingly viscous flow and thus continually prevent agglomeration and sedimentation, by adjusting the air inflow to the changing turbidity of the liquid flow immediately adjacent a nozzle. A residence time of about 15 to about 17 minutes in each tank is typical; total about 30 to 40 min. @ about 60°–80° F.

The air reservoir 63 is supplied by conduit 59 from an air compressor 89 connected to a silencer 91. The compressor processes fresh air and in some instances may pass it through an ozonizer 98, such as the non-sparking, low voltage, AC, face-separated insulated-plate type described in Ser. No. 403,893. However the basic procedure is sufficiently effective in most cases without the additional oxidation provided by ozone.

As seen particularly in FIG. 2, the several air lines 83,88, each angularly dispose their terminal segment 100 transversely within the tank 70 or 72. It is formed with a closed end 101 and a blow outlet mouth 102 is cut wedge-shaped into the hemisphere which is oriented downward when disposed in the tank at a transverse angle to the longitudinal axis of the chamber. Such positioning of the outlet minimizes the possibility of liquid backflow and consequent solid deposition or encrustation therein. Successive segments 100 are mounted crisscross or at different angles so that their outlet mouths are laterally staggered relative to the longitudinal axis of the tank. Functionally, the flow-aligned tanks 70, 72 can be considered to provide the same continuing and accelerating reaction process in tandem structural units—that is, supporting completion of the neutralization process while keeping in suspension the forming flocculate in the increasingly viscous flowstream so as to restrain phase separation.

When it is desired to maximise removal of hardness components and silica, the outflow conduit 73 from the homogenizer tank 72 receives a soda ash increment from a supply tank 99 through line 84 and then passes through a heating zone or unit 85 where the flow is raised to a temperature of about 90° F. to about 120° F. before introduction to the treatment tank 82 where it is agitated by a motor driven agitator or marine type impeller 86. Location of four intermediate-length upstanding baffles 87 in the tank enables or directs the liquid suspension to circulate in closed paths of generally vertical ellipses between adjacent baffles.

From the treatment tank 82, a conduit 90 carries the flow to a flocculation chamber 92 which may have inclined walls and/or corrugated floor segments separated by upstanding baffles which form a convoluted pathway for descending sediment and liquid. Individual floor segments are movable by pneumatic actuators 93 driven by air lines 94. Each unit of the apparatus has been electrically insulated from the ground and from successive (adjacent) units, being connected together by plastic conduits, the chambers preferably being formed of non-conductive material (concrete, wood, etc.) and in any event lined with corrosion-resistant layer such as plastic or glass fiber. The flowstream or liquid medium may now be grounded by closing a switch 95 connected to an electrode 96 which is exposed to (i.e. inserted within) the fluid of the chamber 92. Consequent discharge of the galvanic charge carried by the particulate matter (which is now oxidized to the extent possible) initiates a relatively rapid precipitation of the potentially solid components from the liquid medium. Residence time in the flocculation chamber is on the order of about 30 to about 90 minutes. Distally the sludge, dark red-black from ferric ion, falls into a screw conveyor 97 which passes it through a screen classifier (not shown) and returns the liquid component to the system.

The liquid of the flocculation chamber 92 passes over an airlocked weir 104 into a decanted water tank 106 where a submerged pump 107 moves it through conduit 108 to woven strainer units 109,110, which remove colloids, and thence to an upper inlet of a packed tower 112 where it percolates down through raschig-like rings countercurrent to a stream of (possibly ozonized) air and is then introduced through the conduit 113 to a holding tank 116. Air from the top of the tower is conveyed by line 114 to the decanted water tank 106.

Liquid outflow from the tower 112 passes through conduit 115 to a holding and aeration tank 116, which latter may be connected by a line 117 to a source of chlorine for optional use in particular circumstances (e.g. when required by local ordinance). A compressor 120 with silencer 121 delivers fresh air through conduit 122 to the aeration tank 116 through lines 123, 124, and to a filtered water tank 125 through lines 126, 127, 128.

A gas take-off line 129 connects the filtered water tank 125 with a charcoal-filter exhaust unit 130. The latter is also connected by gas line 131 to the aeration tank 116. The tank 125 has a submerged pump 132 which moves liquid through conduit 133 to an ultimate polishing or holding tank 134. The aeration tank 116 is connected by pump 135 and liquid conduit 136 to dual or alternate activated-charcoal filter tanks 137, 138, having drain lines 139, 140, which are joined to conduit 144 which terminates in the holding tank 125. A backwash line 142 collects fluid from filter tank 134 and delivers it to the decanted water tank 106. A return line 146 connects the backflush outlets of the two filter tanks 137, 138 to the decanted water tank 106. Pump 132 in tank 125 provides product water or water for backwash through line 133 to filters 137, 138 and to product filter tank 134. A backwash line 146 connects the filter tanks to the primary tank 18.

The solids collected in the bottom of the flocculation tank 92 may contain toxins (which have not been detoxified by oxidation). Such can be metals such as mercury, arsenic, boron, lead, iron, gold, silver, etc. as well as some biocides. Non-oxidative pyrolysis may be used to remove organic materials such as petrochemicals. Precipitates such as carbonates and sulfates are decomposed and removed as carbon dioxide and sulfur dioxide. Nitrogen is removed as an inert gas. The metals may be volatised and recondensed or removed in a carbon matrix and then calcined/roasted in the presence of oxygen to prepare a composite of various metallic oxides. The noble metals are recovered as a combined metal concentrate. The particular procedure for any flowstream will be adapted of course to the specific components shown by analysis to be present and which it is desired to recover.

FLOW PATTERN:

Reynolds Number ($N_{Re}$) =

$$N_{Re} = \frac{\text{container diameter (D)} \times \text{velocity of flowing fluid (V)} \times \text{density fluid media} \phi}{\text{Viscosity of flowing media } (\mu)}$$

For example, the iron reaction chamber 50 has the characteristics

| Diameter feet | Liquid Velocity ft./sec. | Liquid Mass Flow-lb/ft²/hr. | Air Mass Flow-lb/ft/hr | $N_{Re}$ | Mass Flow Ratio liquid/air |
|---|---|---|---|---|---|
| 1.5 | 0.0143 | 1763 | 210 | 967 | 8.395 |
| 2.0 | 0.0121 | 1984 | 230 | 1452 | 8.626 |
| 2.5 | 0.0124 | 2540 | 210 | 2320 | 12.095 |
| 2.75 | 0.0116 | 2600 | 210 | 2613 | 12.381 |
| 3.00 | 0.0118 | 2645 | 252 | 2900 | 10.496 |

A critical factor for such sewage or waste water treatment in the presence of particulate matter and sulfite/sulfate ion or hydroxyl ion is defined as Shape Factor $$(SF) = \frac{\psi \, DA}{HFA}$$

wherein $\Psi$ = particulate concentration factor
$DA$ = nominal air lift Disengaging Area
$HFA$ = waste fluid hydraulic flow area.

An operative SF range is from about 9.5 to about 11.3; optimum 10±0.5

EXAMPLE

Municipal sewage with the bulk solids reduced in size to the designated particulate diameter was flowed through a processing assembly such as here illustrated, the initial acidity made pH 1.5 to 2.5 by introduction of liquid and/or gaseous sulfur dioxide. The liquid flow was then moved through the serpentine flow pattern of tank 35 (shape factor 9-10) at $N_{Re}$ of about 5000 to about 10,000 when in contact with the gaseous flow and about 7000 to about 18,000 when not in contact with the gaseous flow; the gas mixture of $SO_2$ and air was moved at about $N_{Re}$ 400 to about 500.

After about 7½–15 minutes residence in the iron reaction chamber 50, the flow was passed through the air-blow tank 62 and thence to the neutralizer tank 70 where the pH was increased from about 8.5 to about 10.0 during a period of about 15 minutes; it continued through the homogenizing tank 72 for about 15 minutes while the pH increased to a maximum of about 11.

When the operation is particularly directed to removal of calcium and magnesium ions ["hardness" components] and also to reduce the concentration of silica, 15–30% of the sludge removed from the screens (subsequent to flocculation) is returned to the homogenizer tank to augment the particulate concentration and increase interfacial surface area, thus

| Type Particulate | Particle Size Dia. microns | Density mg./cm³ | Amount g./liter | In Liquid System Interfacial Surface area, cm²/liter |
|---|---|---|---|---|
| Solution born | 30–225 | 192–1500 | 0.3–0.9 | 660–13000 |
| Flocculants | 100–350 | 300–3500 | 0.04–0.3 | 25–4500 |
| Precipitates | 200–700 | 250–500 | 0.07–0.09 | 14–135 |
| Additives | 75–250 | 320–1700 | 0.10–16 | 40–4800 |
| soda ash Recycle Sludge | 30–700 | 192–3500 | 0.01–4.8 | 250–3360 |

Such size additives include fly ash, carbon black, infusorial earth, etc.

The flow is then moved through an agitation and heating zone 82 at $N_{Re}$ of about 30,000 to about 40,000 with addition of soda ash. Alternate to use of mechanical propellors, complete agitation with blown air may be achieved when there is 1.5–3.0 CFM/minute/ft² of cross section area.

Finally the fluid flow is moved at $N_{Re}$ of about 2000 to about 3700 for about 30 to about 90 minutes through the flocculation tank or sedimentation zone 92.

In retrospect, the addition of particulate matter by the present process may be distinguished from various incidental additions of particles to liquids in the past in that the latter were (a) for removal of dispersed colloids by adding charged particles in order to agglomerate the two substances, or (b) for removing a solute by addition of a substance which decreases the solubility of one or more of the dissolved components. Neither of these treatments contemplates (or obtains) a continuing reaction [oxidation] between the dispersed particles and a gaseous component adhered to the added particle, and/or the interplay of free electrons in such environment, which electrons take part in the desired continuing reaction. Nor do they contemplate deliberately maintaining such dispersion and preventing agglomeration during a necessary (multi-step) reaction period; nor final precipitation by introduction of a flocculating ion. In brief, the provision and utilization of an insulated flowing body of polar liquid constituting a galvanic or ionic exchange module [cell] the contents of which is continually manipulated both to prevent phase separation (precipitation) and to effect a desired chemical reaction (ultimately resulting in joint liquid purification and separation of solids) seems to have been entirely overlooked or unappreciated. The necessary polar solvent such as water, contrasts with non-polar solvents such as mineral oil, paraffins, kerosene, etc. which are not suitable because of being incapable of transmitting an electric current.

It should be appreciated that the intended and necessary result from applying the dimensionless flow parameters related herein, is that (1) sedimentation and agglomeration are prevented, and (2) at their active surface area, the dispersed particles maintain the intermolecular attraction, often referred to as the Van der Waals effect, which attracts to and causes to adhere thereto clusters of moving air molecules (bubbles). The result is not only the progressive oxidation of the flowing particles, but also subsequently the electrical and interatomic field force which is thus continued, appears responsible for "drawing out" of solution the dissolved electrolytes of both positive and negative charge, such as the halide [chlorine] ions and alkali [sodium] ions which finally are separated from the medium as one component of the flocculate.

In addition to the Reynolds Number which relates the fluid density and velocity with the container configuration, the following parameters should be taken into account The heat transfer and energy retaining properties of the flowing fluid are defined by the Peclet Number $=DV_\rho Cp/k$ or $$\frac{Cp \; SpR^2}{k + 4/3 \; Dpp\sigma T^3}$$

Cp=specific heat; $\sigma$=surface tension; k=thermal conductivity. The Peclet Number for tanks 70 and 72 is in the range of 12 to 32, and gas escape velocity at the surface is 0.18 to 0.24 ft./sec.

The Schmidt Number relates viscosity, density and container diameter (hydraulic diameter in an awkwardly shaped vessel) $N_{Sc}=\mu/\rho DV$.

The Stanton Number relates the coefficient of heat transfer (h) to the specific heat, velocity and density. $N_{St}=h/C_p V_\rho$ The Weber Number relates the shape of the container (length of flow path L), the density, the velocity, and surface tension. $N_{We}=L_\rho V^2/\sigma g_c$ Contact Number $N_c=(U^2/\rho^2 g)^{\frac{1}{2}}(N_{Re})^{\frac{1}{2}}(N_{Sc})^{\frac{1}{2}}$ The iron tank 50 has an operable range Schmidt No. $4\times 10^{-7}$ to $1.3\times 10^{-6}$; the contact number is 228 to 446.

Reaction gases (air, sulfur dioxide, nitrogen, ozone, etc.) can be introduced into the stream of particulate-laden fluid by eduction, sparge lines, or blow-shear tube. Each of these operates within a precise Lehman Reaction Number and Weber Number range. The dimensionless Lehman Reaction Number relates the System Shape Factor and the mass flows of fluid and gases.

| System | LRN | Weber |
| --- | --- | --- |
| Eductor System | 25–30 | 1.0–1.7 |
| Sparge Lines | 3.4–4.4 | 0.92–1.98 |
| Blow-Shear Tube | 6.7–7.7 | 0.98–1.85 |

The terminal velocity of spherical and non-spherical droplets or particles settling in the vapor space will vary from 0.4 to 30 ft/sec. Particles up to 85 microns will be entrained and are removed prior to gas flow to the iron tank 50.

Flow conditions within the heater tank 85 are defined by a Reynolds Number of 30,000 to 40,000, and a Grashof-Prandtl Number product within the range of 25,600 to 230,000 on the water-particulate matter side. In removing hardness components, the heater tank is operated at a temperature of 105° F.±5° F., the fluid leaving the tank between 100° F. and 110° F. Introduction of additional particulate matter by line 103 into the line 73 (effluent from the homogenizer tank 72) as noted earlier, provides 30 to 85% more surface area in the final stages of magnesium conversion to magnesium carbonate and then to magnesium hydroxide (a solid). Magnesium oxide and magnesium hydroxide also promote silica removal. The reintroduced sludge at this point, composed of mechanically formed particulate matter, flocculates and precipitates, is very effective in assisting the soda ash in final removal of silica and magnesium. The electrical charge on the particulate matter also increases the rapidity and effectiveness of silica removal. Magnesium and calcium chlorides, sulfates and nitrates are converted to solid magnesium hydroxide and calcium carbonate. Since Ca and Mg exist in hard water primarily as chloride, bicarbonate and sulfates, they are removed by the present process.

The way the present system handles hexavalent chromium and cyanides is of particular interest. As the recirculating gas stream of oxygen, nitrogen and sulfur dioxide contacts the particulate matter and soluble salts, the sulfite ion reacts with any metallic ions present. Hexavalent chromium is reduced to trivalent chromium in about 15 minutes at pH 2.0 to 2.5. As a reductant, the sulfur dioxide consumes oxygen but the latter is continually being replaced. In the iron reaction tank, ferrous sulfate is produced, which also acts as a hexavalent chromium reductant. This insures complete conversion to trivalent chromium. As the latter flows into the neutralization tank (with an initial pH of 8.0 to 8.5) its coupling with hydroxyl ion results in a light and voluminous precipitate which is continually mixed with the ferrous hydroxide that is changing to ferric hydroxide (a heavier precipitate). In a total residence time of about 30 minutes in tanks 70 and 72, this reaction goes to completion—the precipitate continuing to be suspended as a result of air driven "churning" which maintains an oxygen-saturated medium—the pH eventually reaching about 10.5 to 10.8 or 11. Discharge conduit 73 delivers a finely dispersed, charged particle that agglomerates rapidly in the region of the flocculation/sedimentation zone 92.

When cyanides are present it is necessary to oxidize them to cyanate and thence to free carbon dioxide and nitrogen gas (both of which could be vented freely). If cyanide ion were oxidized in acidic medium, cyanide gas would result and require special handling precautions. Alternately, if cyanide is oxidized to cyanate in highly basic medium, it requires an extended reaction period. However, in the presence of the great amount of reactive oxygen carried by the particulate dispersion, cyanide can be oxidized to cyanate at pH 8.5 in approximately 5 minutes (in tank 70). If then this cyanate is exposed (i.e. returned by line 105) to oxygen and ferrous ion of the iron tank, an iron cyanate complex is formed. After passage through the blow tank 62, the flow reenters the neutralization tank 70 where hydroxyl ions react with the cyanate complex to form carbon dioxide and nitrogen. At the same time ferric sulfate is hydrolysed to ferric hydroxide: $Fe_2(SO_4)_3+6H_2O=2Fe(OH)_3+3H_2SO_4$ Upon grounding of the fluid, the ferric hydroxide separates as platelets which are as large as a quarter inch across, dark red to black and firmly compacted in comparison with the fine, greyish, amorphous precipitate formed by ferrous hydroxide.

Waste water treatment by the present system produced the following—

| WATER PRIOR to TREATMENT | Waste water treatment by the present system produced the following-- | | | Sludge concentrate:spectrographic analysis. |
|---|---|---|---|---|
| | | % Reduction of Initial concentration found in Product Water prior to filtration. | | |
| pH 5.1 | | pH 7.2 | | pH 8.2:sp.gr.1.094 |
| Al | 430.0 mg/l | 0.5 mg/l | 99.9% | 33.700 % by wt. |
| Ca | 616.0 | 536.0 | 13.0 | 1.080 |
| Mg | 145.8 | 53.5 | 63.3 | 3.230 |
| Boron | 105.0 | 16.6 | 84.2 | .190 |
| Cu | | | | .009 |
| Iron | 700.0 | 70.0 | 90.0 | 6.670 |
| Silicon | | | | 1.660 |
| Titanium | | | | .640 |
| Mn | 1.3 | .20 | 84.6 | 1.030 |
| Sodium | 13750. | 1550.0 | 88.7 | 48.230 |
| Potassium | 240. | 14.5 | 94.0 | 2.810 |
| | | | | 99.249% |
| Ammonia | 5.85 | | 96.6 | |
| Total hardness (as $CaCO_3$) | 2140.0 | 1560.0 | 27.2 | |
| Fluoride | 113.0 | 6.25 | 94.5 | |
| Chloride | 1240. | 152.0 | 87.8 | |
| Sulfate | 32000 | 4050.0 | 87.4 | |
| Phosphate | <.2 | <.2 | | |
| Total Organic Carbon (TOC) | 16.0 | 18.0 mg/l | | |
| Free Carbon Dioxide (as $CO_2$) | 20.0 | 5.0 | | |
| Total Dissolved Solids | 62338. | 7598. | 87.8 | |
| Total Solids | 69514 | 7652 | 89.0 | |
| Suspended Solids | 7176. | 54.0 | 99.25 | |
| Chemical Oxygen Demand | 765.0 | 38.3 | 95.00 | |
| Volatile Solids | 1599 | 464. | 71. | |
| Dissolved oxygen | 0 | 4.5 | | |
| Surfactants | 2.0 | .6 | 70. | |
| Turbidity | 18500 JTU units | 35.0 JTU | 99.8 | |
| Specific conductance 25 C. | 45000 micromhos/cm | 7600. | | 29,100. |

The unexpected usefulness of the present (water) treating process in killing and agglomerating viral and other monocellular life forms may be attributed to the cumulative effect or concurrance of a number of individual factors, at least some of which have a unique effect even alone. These factors are—

(1.) The broad band shift from extreme low to extreme high pH (i.e. 1.5 to 11), as well as residence at each end of the spectrum, effects the range of organisms of which individual groups may be resistant to acidic or basic media only, but not to extremes of both pH.

(2.) In this connection, the rapidity (e.g. 15 to 30 minutes) as well as the range or strength of the shift of pH appears important. An organism could better acclimate or survive slow or mild change.

(3.) Residence time during which the whole medium or environment is undergoing treatment at each end of the flow-process, comprising gaseous interchange, continued suspension/agitation, oxidation and ion exchange, is significant.

(4.) Relative density and composition of particulate matter in the flow-medium, compared to the volume of water being treated is an important parameter. (Total area particles $cm^2/l$, = 130 to 13,280.)

(5.) The additional effect [attraction to living or newly dead cells] contributed by the galvanic charge which is carried by the particles is effective. In this connection, it is referred to obtain the initial low acidity (plus galvanic charge) by introduction of sulfur dioxide, rather than by addition of formed acid, since the $SO_2$ produces hydrogen ions and shifting electrons by dissociation of water.

(6.) Detergent action results from sulfonation of fat and oil components of the medium and especially from such ingredients which may form part of the viral/bacterium capsule/membrane. Proteinacous components of the membrane may also conjugate; subsequent salting out of the organic salts then exposes the cell contents to caustic attack or saponification.

(7.) Under these critical conditions, lime is particularly effective against some viruses.

(8.) Rapidity and completeness of flocculation is important, e.g. 5 to 7 minutes after grounding, in comparison with a minimum of 25 to 35 minutes or more which might be required in "merely" clarifying murky water by flocculating with Al or Fe ions.

(9.) The total kill is achieved without recourse to chlorine or other toxic agent, and without need to modify the treatment so as to target it at a specific organism first determined to be present. Such process can be used to "harvest" pestilential life forms for identification and study; by extracting samples from successive process steps, the susceptibility of the cell to each step is learned.

Additional examples of particulate matter include infusorial earth, diatomaceous earth, bentonite, and siliceous matter such as free-flowing sand, silicones, etc.

We claim:

1. An apparatus for purification of contaminated liquid comprising a plurality of sequentially flow-connected units, each electrically insulated from the ground and adjacent units and including liquid flow control means for moving a liquid medium through each unit at a predetermined flow rate which prevents coalescence of particles suspended in the medium, said units being sequentially arranged as follows: (a) liquid inlet and container means including associated means for selectively mascerating and distributing solid components which will accept a galvanic charge into the liquid medium; (b) acidic treatment means flow connected to said container means and including means for regulation of pH by selective introduction of acidic and gaseous oxidizing agents throughout the medium; (c) container and reactant means flow connected to said last reaction means and comprising a source of soluble metal ions adapted to mingle with the flowing medium for reaction with said acidic and oxidizing agents to impart a galvanic charge on said solid components, and means for subsequently aerating the medium by passing air therethrough; (d) neutralizing means flow connected to said last reactive means and including an elongated chamber containing successive downstream air delivery conduits individually having ejection nozzles transversely disposed within the flow stream at successive staggered angular displacement from a longitudinal axial plane of the chamber, which conduits have individual flow control means for adjusting air inflow therethrough to changing turbidity of the flow stream immediately adjacent a nozzle and thus restrain precipitation from the medium; and (e) means for flocculating separable components of the alkaline flow stream including electrode and switch means connected with said elongated for electrically grounding the alkaline medium.

2. An apparatus according to claim 1 which includes, subsequent to unit (d): means for introducing soda ash into the flow stream and means for simultaneously heating and agitating such flow stream and thereby continually restraining precipitation.

3. An apparatus according to claim 1 wherein said source of soluble metal ions of unit (c) comprises iron.

4. An apparatus according to claim 1 wherein said source of soluble metal ions of unit (c) comprises aluminum.

* * * * *

UNITED STATES PATENT OFFICE
CERTIFICATE OF CORRECTION

Patent No. 4,340,473          Dated July 20, 1982

Inventor(s) William E. Lindman and John A. Alexander

It is certified that error appears in the above-identified patent and that said Letters Patent are hereby corrected as shown below:

Col. 1, line 48 "Trus" should be --Thus--

Col. 3, line 32 "$NH^+$" should be --$NH_4^+$--

Claim 1, col. 16, line 13 --chamber-- should be inserted after "elongated".

Signed and Sealed this

Twenty-second Day of February 1983

[SEAL]

Attest:

Attesting Officer

GERALD J. MOSSINGHOFF

Commissioner of Patents and Trademarks